US010228756B2

United States Patent
Shilimkar et al.

(10) Patent No.: US 10,228,756 B2
(45) Date of Patent: *Mar. 12, 2019

(54) VOLTAGE REGULATOR HAVING CIRCUIT TO CONTROL SUPER CAPACITOR

(71) Applicant: INTEL CORPORATION, Santa Clara, CA (US)

(72) Inventors: Vikas S. Shilimkar, Corvallis, OR (US); Don J. Nguyen, Portland, OR (US); Nagasubramanian N. Gurumoorthy, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,971

(22) Filed: Oct. 25, 2016

(65) Prior Publication Data
US 2017/0102763 A1    Apr. 13, 2017

Related U.S. Application Data

(63) Continuation of application No. 14/006,359, filed as application No. PCT/US2011/054495 on Oct. 1, 2011, now Pat. No. 9,477,278.

(51) Int. Cl.
*G05F 1/32* (2006.01)
*G06F 1/3296* (2019.01)
(Continued)

(52) U.S. Cl.
CPC .............. *G06F 1/3296* (2013.01); *G05F 1/10* (2013.01); *G05F 1/32* (2013.01); *G05F 1/46* (2013.01);
(Continued)

(58) Field of Classification Search
CPC ................................ G05F 1/3296; G05F 1/32
See application file for complete search history.

(56) References Cited

U.S. PATENT DOCUMENTS

| 7,541,693 B2 | 6/2009 | Huang et al. |
| 7,667,447 B2 | 2/2010 | Huang et al. |

(Continued)

FOREIGN PATENT DOCUMENTS

| CN | 1420405 A | 5/2003 |
| CN | 1591265 A | 3/2005 |

(Continued)

OTHER PUBLICATIONS

International Search Report and Written Opinion dated May 16, 2012 for corresponding Application No. PCT/US2011/054495.

(Continued)

*Primary Examiner* — Jue Zhang
*Assistant Examiner* — Trinh Q Dang
(74) *Attorney, Agent, or Firm* — Schwabe, Williamson & Wyatt, P.C.

(57) ABSTRACT

A voltage regulator may be provided that includes a first circuit to receive at least one feedback signal from a buck converter and to provide at least one driving signal to the buck converter to provide an output voltage based on the at least one feedback signal, and a second circuit to control a super-capacitor to provide the output voltage when the first circuit is not using the buck converter to provide the output voltage.

17 Claims, 5 Drawing Sheets

(51) Int. Cl.
  *H02M 3/156* (2006.01)
  *H02M 1/32* (2007.01)
  *H02M 3/158* (2006.01)
  *H02J 7/34* (2006.01)
  *G06F 1/26* (2006.01)
  *G05F 1/10* (2006.01)
  *G05F 1/46* (2006.01)
  *G05F 1/56* (2006.01)
  *G06F 1/3287* (2019.01)
  *G06F 1/3209* (2019.01)
  *H02M 1/00* (2006.01)

(52) U.S. Cl.
  CPC ............ *G05F 1/56* (2013.01); *G06F 1/26* (2013.01); *G06F 1/3209* (2013.01); *G06F 1/3287* (2013.01); *H02J 7/345* (2013.01); *H02M 1/32* (2013.01); *H02M 3/156* (2013.01); *H02M 3/158* (2013.01); *H02M 2001/0032* (2013.01); *Y02B 70/16* (2013.01)

(56) References Cited

U.S. PATENT DOCUMENTS

| | | | |
|---|---|---|---|
| 8,063,618 B2 | 11/2011 | Lam et al. | |
| 2003/0090251 A1 | 5/2003 | Nakashimo | |
| 2005/0162141 A1 | 7/2005 | Kanakubo | |
| 2007/0040536 A1* | 2/2007 | Smith, Jr. | H02M 3/157 323/280 |
| 2007/0235293 A1* | 10/2007 | Steimer | H02M 7/49 200/2 |
| 2008/0082839 A1 | 4/2008 | Dibene et al. | |
| 2008/0088292 A1* | 4/2008 | Stoichita | H02M 3/156 323/285 |
| 2008/0129219 A1 | 6/2008 | Smith et al. | |
| 2009/0167260 A1* | 7/2009 | Pauritsch | H02J 7/0065 323/233 |
| 2009/0206657 A1* | 8/2009 | Vuk | H01M 10/4264 307/9.1 |
| 2009/0206772 A1* | 8/2009 | Bayer | H02M 3/1582 315/294 |
| 2009/0230934 A1 | 9/2009 | Hooijschuur et al. | |
| 2009/0237040 A1 | 9/2009 | Wadhwa | |
| 2010/0011234 A1 | 1/2010 | Malik et al. | |
| 2010/0109612 A1 | 5/2010 | Nguyen | |
| 2010/0148587 A1* | 6/2010 | Khaligh | H02M 1/10 307/72 |
| 2010/0231187 A1* | 9/2010 | Wicht | H02M 3/156 323/282 |
| 2010/0295472 A1* | 11/2010 | Wibben | H02M 3/158 315/294 |
| 2011/0049991 A1* | 3/2011 | Sato | H02M 1/44 307/48 |
| 2011/0199060 A1 | 8/2011 | Sriram et al. | |
| 2011/0227550 A1 | 9/2011 | Walters et al. | |
| 2012/0223687 A1 | 9/2012 | Liu et al. | |
| 2013/0002165 A1* | 1/2013 | Rouvala | H05B 33/0815 315/294 |

FOREIGN PATENT DOCUMENTS

| | | |
|---|---|---|
| CN | 1667538 A | 9/2005 |
| CN | 1736018 A | 2/2006 |
| CN | 10047475 C | 2/2006 |
| CN | 101359837 A | 2/2009 |
| CN | 101517507 A | 8/2009 |
| CN | 101626194 | 1/2010 |
| CN | 101728875 A | 6/2010 |
| CN | 101965676 A | 2/2011 |
| CN | 101978334 A | 2/2011 |
| EP | 1 508 958 A2 | 2/2005 |
| EP | 2 106 009 | 9/2009 |
| JP | 2007-109609 | 4/2007 |
| JP | 2008-187785 | 8/2008 |
| JP | 2009-171694 | 7/2009 |
| KR | 10-2009-0085973 | 8/2009 |
| KR | 10-2010-0013591 A | 2/2010 |
| KR | 10-2012-0012767 | 2/2012 |
| WO | WO 2004/047260 A2 | 6/2004 |
| WO | WO 2013/048535 | 4/2013 |

OTHER PUBLICATIONS

International Search Report for Application PCT/US2013/059993 dated Dec. 27, 2013.
Chinese Office Action for Application 201180074530.5 dated Dec. 3, 2014 and English language translation.
International Preliminary Report on Patentability and Written Opinion received for PCT Application No. PCT/US2011/054495 dated Apr. 10, 2014 (6 pages).
U.S. Office Action issued in U.S. Appl. No. 14/006,359 dated Jun. 18, 2015.
U.S. Final Office Action issued in U.S. Appl. No. 14/006,359 dated Dec. 17, 2015.
U.S. Notice of Allowance issued in U.S. Appl. No. 14/006,359 dated Jun. 23, 2016.
Translation of Taiwanese Search Report issued in Application 101134275 dated Mar. 15, 2016.
English translation of German Office Action issued in Application 11 2011 105 699.0 dated Nov. 30, 2016

* cited by examiner

VOLTAGE REGULATOR HAVING CIRCUIT TO CONTROL SUPER CAPACITOR

This application is a Continuation Application of U.S. patent application Ser. No. 14/006,359, filed Sep. 20, 2013, which is U.S. National Stage Application under 35 U.S.C. § 371 of PCT Application No. PCT/US2011/054495, filed Oct. 1, 2011, whose entire disclosure is hereby incorporated by reference.

BACKGROUND

1. Field

Embodiments may relate to a voltage regulator for an electronic device.

2. Background

Electronic devices (or platform loads) may be powered by a battery and a voltage regulator. Voltage regulator (VR) losses are major contributors in total platform power loss. Residency (or probability) of a voltage regulator output current may show where this power is lost most of the time. For example, approximately 50% of the time, the voltage regulator may operate at an idle condition. An idle condition may be a no load condition or a low load condition. Electronic devices may be idle for a significant portion of the battery life. Thus, a reduction of power losses in idle states may be a critical aspect in platform power delivery. One contributor for voltage regulator high power losses is a switching loss in direct current (DC)-direct current (DC) buck type voltage regulators.

BRIEF DESCRIPTION OF THE DRAWINGS

Arrangements and embodiments may be described in detail with reference to the following drawings in which like reference numerals refer to like elements and wherein:

FIG. 5 is a timing diagram of a voltage regulator when power to a platform load is first turned ON;

DETAILED DESCRIPTION

Figure 1:
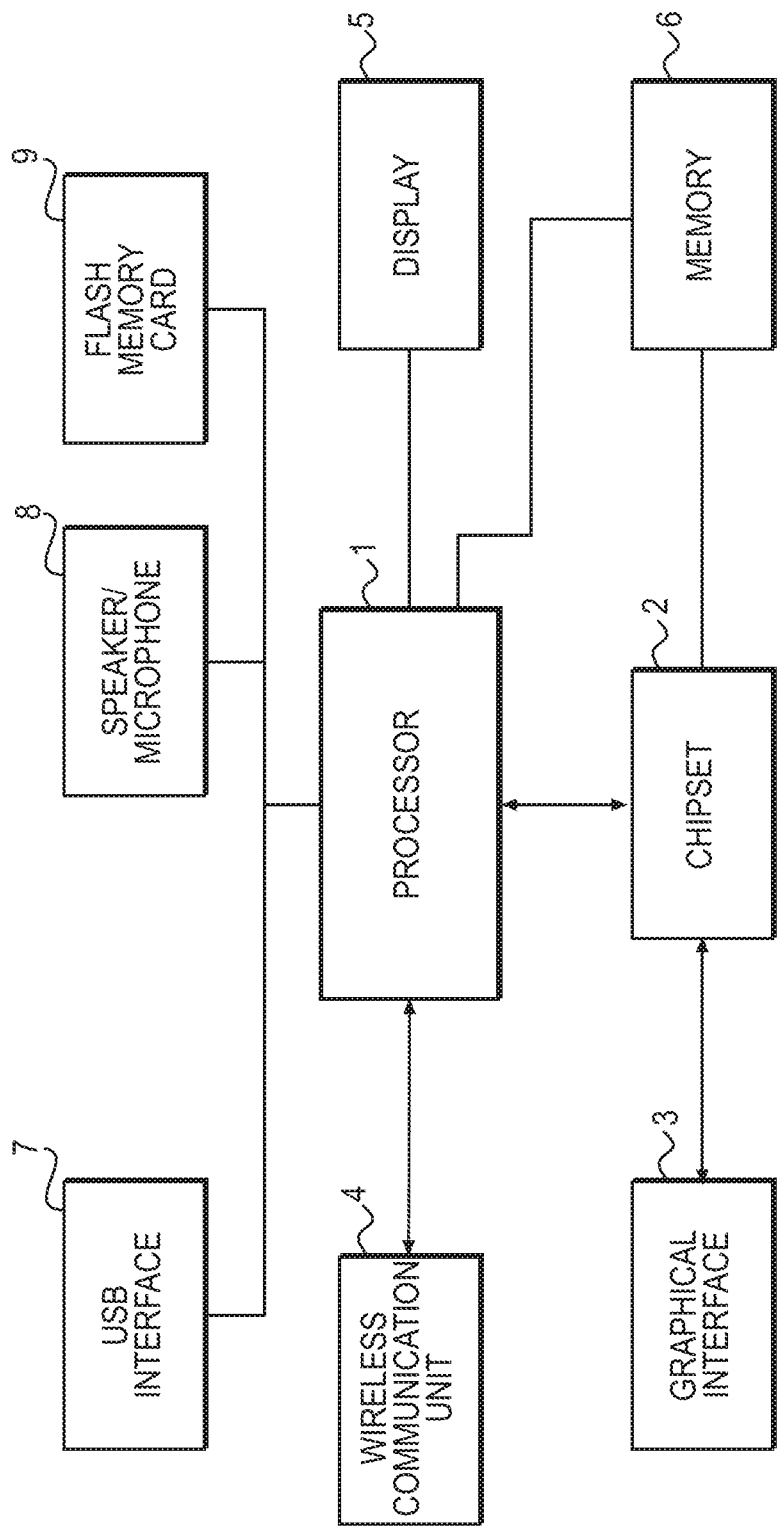
FIG. 1 shows an example of an electronic device.

In the following detailed description, like reference numerals may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

In the following description, signals may be described as being asserted. This may correspond to being a HIGH signal (or a 1). Signals may also be described as being de-asserted. This may correspond to being a LOW signal (or a 0).

An electronic device (also hereafter referred to as a platform load) may receive a direct current (DC) voltage from a voltage regulator. The voltage regulator may be provided external of the electronic device or the platform load.

FIG. 1 shows an example of an electronic device. Other configurations may also be provided. The electronic device (or platform load) may be any one of a number of battery-powered devices, such as, but not limited to, a mobile phone, a personal digital assistant, a media player, and/or a laptop or notebook computer. Alternatively, the electronic device may be an AC-powered device that is usually used at a fixed location such as a desktop computer, a television, a digital video disc (DVD) or other type of media player, surround-sound and/or other media receiver just to name a few.

As shown in FIG. 1, the electronic device may include a processor 1, a chipset 2, a graphical interface 3, a wireless communications unit 4, a display 5, a memory 6, and a plurality of functional circuits including a universal serial bus (USB) interface 7, speaker and microphone circuits 8, and a flash memory card 9. A media player may also be provided. In other embodiments, a different combination or arrangements of circuits and functions may be included.

Figure 2:
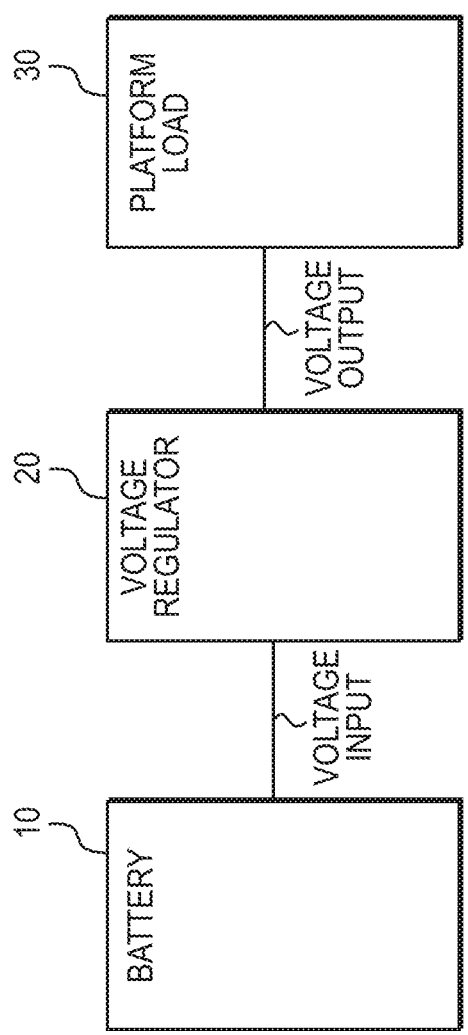
FIG. 2 shows an example of a power system for an electronic device (or platform load)

FIG. 2 shows an example of a power system for an electronic device (or a platform load). Other configurations may also be provided. The features of FIG. 2 may also be considered an apparatus, a system and/or an electronic device.

FIG. 2 shows that a battery 10 may provide a direct current (DC) voltage (or voltage input) to a voltage regulator (VR) 20. The voltage regulator 20 may adjust the received voltage input to a voltage output, which may then be provided to a platform load 30 (or electronic device). The power system may include the voltage regulator 20 and the battery 10. The voltage regulator 20 may provide a DC voltage to the platform load 30, which is an electronic device.

As will be described below, embodiments may use a super capacitor to supply a required power during light load conditions. This may result in a significant improvement in energy requirement at a particular load. An improvement may also be made in noise performance of the power source.

Figure 3:
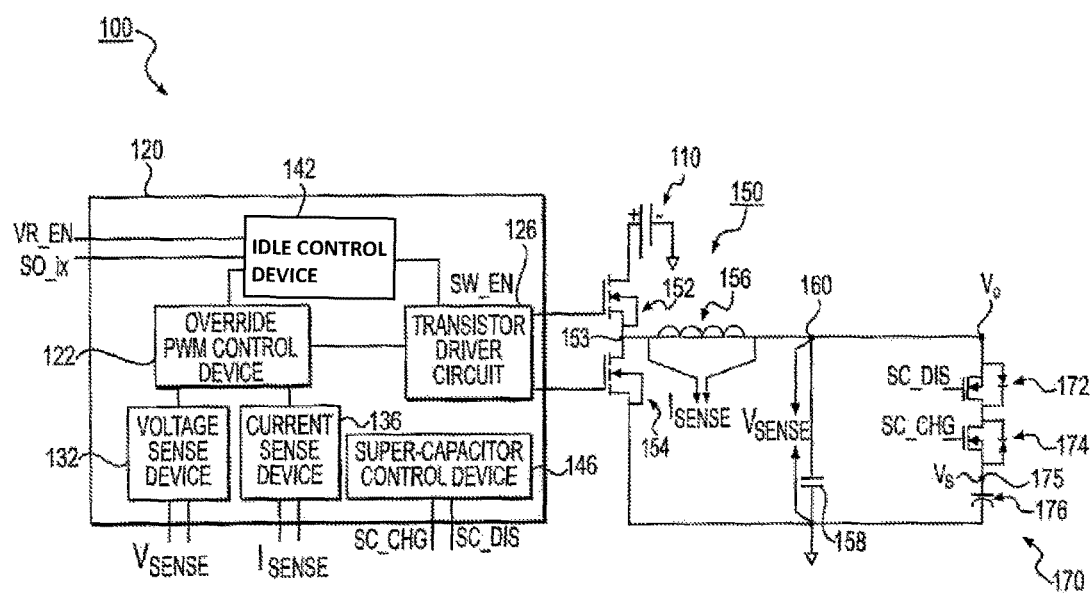
FIG. 3 shows a voltage regulator according to an example embodiment.
Figure 4:
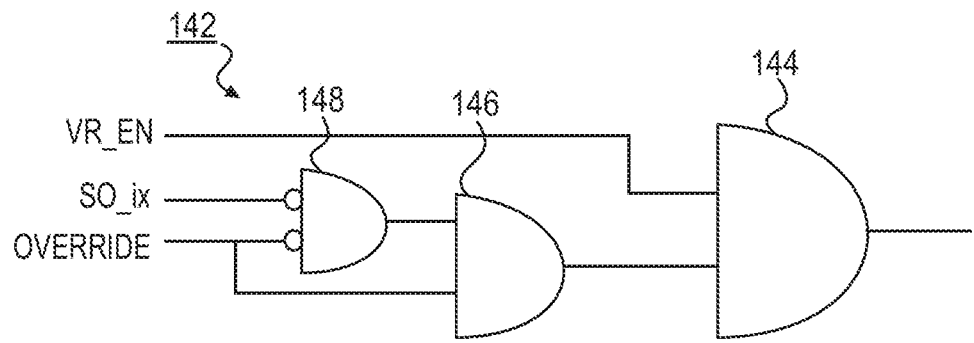
FIG. 4 shows an example of an idle control device.

FIG. 3 shows a voltage regulator according to an example embodiment. FIG. 4 shows an example of an idle control device for the voltage regulator of FIG. 3. Other embodiments and configurations are also within the scope of this disclosure. The voltage regulator shown in FIG. 3 may correspond to the voltage regulator shown in FIG. 2. Other configurations of the idle control device may be provided. The features of FIG. 3 may also be considered an apparatus, a system and/or an electronic device.

More specifically, FIG. 3 shows a voltage regulator 100 that includes a voltage controller 120, a buck converter 150 and a super-capacitor device 170. The voltage regulator 100 may be coupled to a battery 110, which may correspond to the battery 10 of FIG. 2. The battery 110 may provide a DC voltage to the voltage regulator 100.

The voltage regulator 100 (and more specifically, the voltage controller 120) may include a pulse width modulation (PWM) control device 122, a transistor driver circuit 126 (or a field effect transistor (FET) driver), a voltage sense device 132, a current sense device 136, a super-capacitor control device 146, and an idle control device 142. The PWM control device 122, the transistor driver circuit 126, the voltage sense device 132, the current sense device 136 and the idle control device 142 may be considered a first circuit, and the super-capacitor control device 146 may be considered a second circuit.

The buck converter 150 may include a first switch transistor 152, a second switch transistor 154, an inductor 156, and a capacitor 158. Each of the first switch transistor 152 and the second switch transistor 154 may be a field effect transistor (FET). As shown in FIG. 3, the first switch transistor 152 and the second switch transistor 154 are coupled in series between the battery 110 and a ground.

A middle node 153 between the first switch transistor 152 and the second switch transistor 154 is coupled to the first end of the inductor 156. The second end of the inductor 156 is an output node 160 that provides an output voltage $V_O$ to the platform load (or the electronic device).

As shown in FIG. 3, the capacitor 158 of the buck converter 150 is coupled between the output node 160 and ground. The first end of the capacitor 158 is coupled to the second end of the inductor 156 (i.e., the output node 160), and the second end of the capacitor 158 is coupled to ground.

The buck converter 150 may provide feedback signals to the voltage controller 120 so that the voltage controller 120 may control the buck converter 150. For example, a first feedback signal $I_{SENSE}$ is a voltage across the first end of the inductor 156 (or the node 153) and the second end of the inductor 156 (or the node 160). The first feedback signal $I_{SENSE}$ may be an input to the current sense device 136 of the voltage controller 120. The current sense device 136 may receive feedback signals indicative of current in the buck converter 150.

The buck converter 150 may further provide a second feedback signal $V_{SENSE}$ based on a voltage at the output node 160 (between the inductor 156 and the capacitor 158) and ground. The second feedback signal $V_{SENSE}$ may be input to the voltage sense device 132 of the voltage controller 120. The voltage sense device 132 may receive a feedback signal indicative of the output voltage. The second feedback signal may also be taken from the platform load.

The second feedback signal $V_{SENSE}$ and the first feedback signal $I_{SENSE}$ may help stabilize the output voltage $V_o$ of the voltage regulator 100 to within a desired tolerance. The first feedback signal $I_{SENSE}$ may also help protect the voltage regulator 100 from over current conditions.

The voltage sense device 132 may provide an output signal to the PWM control device 122, and the current sense device 136 may provide an output signal to the PWM control device 122. The PWM control device 122 may control the transistor driver circuit 126. The PWM control device 122 may further provide an OVERRIDE signal based on the signal received from the voltage sense device 132. In an idle condition when the output voltage goes below the tolerance ($V_O-\Delta V$), the OVERRIDE signal is asserted. For example, $\Delta V=\text{Tolerance}*V_o/100$. The tolerance is a percentage of the allowed output change.

The voltage sense device 132 may receive a feedback signal indicative of the output voltage $V_o$. The current sense device 136 may receive a feedback signal indicative of current in the buck converter 150 (i.e., current through the inductor 156).

The pulse width modulation control device 122 may receive signals from the voltage sense device 132 and the current sense device 136. The pulse width modulation control device 122 may provide the OVERRIDE signal based on the signal received from the voltage sense device 132.

The transistor driver circuit 126 may provide driving signals to control the first switch transistor 152 and the second switch transistor 154 of the buck converter 150. More specifically, the transistor driver circuit 126 may apply pulse width modulation signals to the first and second switch transistors 152, 154 of the buck converter 150. The width of the signals may control the timing of the first and second switch transistors 152, 154. The driving signals may be adjusted (or provided) based on the feedback signal.

The super-capacitor device 170 may include a first control transistor 172, a second control transistor 174 and a super-capacitor 176. Each of the first control transistor 172 and the second control transistor 174 may be a field effect transistor.

The first control transistor 172, the second control transistor 174 and the super-capacitor 176 are coupled in series between the output node 160 and ground, and may control the output voltage $V_O$. A voltage Vs at a node 175 may represent voltage in the super-capacitor 176. The first control transistor 172 may receive a driving discharge signal SC_DIS, which generally relates to discharging the super-capacitor 176. The second control transistor 174 may receive a driving charge signal SC_CHG, which generally relates to charging the super-capacitor 176. Accordingly, the first control transistor 172 and the second control transistor 174 may act as control switches to control the flow of charge into and out from the super-capacitor 176.

As one example, the super-capacitor 176 may be an electrochemical capacitor with a relatively high energy density. The super-capacitor 176 may also be referred to as an electric double-layer capacitor.

The first and second control transistors 172, 174 are controlled by the driving signals SC_CHG and SC_DIS that are generated by the super-capacitor control device 146 (of the voltage controller 120). For example, on a powering on condition, the super-capacitor control device 146 may make sure that the super-capacitor 176 becomes fully charged. Additionally, in the idle state (or condition), the super-capacitor control device 146 may discharge the super-capacitor 176 to supply power, such as to the platform load. In a power cycle or non-idle state, the super-capacitor control device 146 may isolate the super-capacitor 176 from being discharged.

As one example, when both the driving signals SC_CHG and SC_DIS are HIGH (or 1), then the super-capacitor 176 may be ON for charging as well as discharging. When the driving signal SC_DIS is HIGH and the driving signal SC_CHG is LOW (or 0), then the super-capacitor 176 may only discharge (without charging). When the driving signal SC_DIS is LOW and the driving signal SC_CHG is HIGH, then the super-capacitor 176 may be only charging (without discharging). Further, when both the driving signals SC_DIS and SC_CHG are LOW, then the super-capacitor 176 may be disconnected (or isolated).

As shown in FIG. 4, the idle control device 142 includes a logical AND device 144, a logical OR device 146 and a logical device 148, such as a 2-input Negative AND gate. Other logical devices or gates may be used for the idle control device 142.

The idle control device 142 may receive two input signals, namely a first input signal VR_EN and a second input signal SO_iX. The first and second input signals may be provided from the platform load, such as the platform load 30 shown in FIG. 2.

The first input signal VR_EN may represent the turning on or off of the platform load. The first input signal VR_EN may be HIGH when the platform load is powered ON, and the first input signal VR_EN may be LOW when the platform load is not powered ON.

The second input signal SO_iX may represent an idle condition of the platform load. The second input signal SO_iX may be HIGH when the platform load is in an idle state (or condition), and the second input signal SO_iX may be LOW when the platform load is not in an idle state.

The logical device 148 may receive an inverted second input signal SO_iX and an inverted OVERRIDE signal. The logical device 148 may perform a logical AND operation based on the received signals. An output of the logical device 148 may be provided to an input terminal of the logical OR gate 146.

The logical OR device 146 may receive two input signals, one from the logical device 148 and one from the PWM control device 122. The signal from the PWM control device 122 may be the OVERRIDE signal. In the idle state, the OVERRIDE signal may be provided when the output voltage $V_O$ falls below a prescribed value, such as $V_O-\Delta V$.

The logical OR device 146 may perform a logical OR operation on the received input signals. The logical OR device 146 may provide an output signal to the logical AND device 144.

The logical AND device 144 may receive two input signals, the first input signal VR_EN and one from the logical OR device 146. The logical AND device 144 may perform a logical AND operation based on the received signals. The logical AND device 144 may provide an output signal (i.e., a transistor driver enable signal SW_EN) to the transistor driver circuit 126.

FIG. 3 shows that the buck converter 150 may receive a DC voltage from the battery 110, and may provide the output voltage $V_o$. The voltage controller 120 may receive a feedback signal from the buck converter 150. The voltage controller 120 may provide driving signals to the first and second switch transistors 152, 154 based on the feedback signal(s). The super-capacitor device 170 may provide the output voltage $V_o$ when the buck converter 150 is turned off.

The voltage controller 120 may turn on the buck converter 150 when the second input signal SO_iX is received indicative of a platform load being initially turned on. An output voltage may be provided from the voltage regulator 100 while the buck converter 150 is turned off. The super-capacitor 176 may be charged while the buck converter 150 is turned on. The voltage controller 120 may turn off the buck converter when the first input signal VR_EN is received indicative of the platform load being in an idle state (or idle condition). At that time, an output voltage may be provided from the super-capacitor 176 while the buck converter 150 is turned off.

The idle control device 142 may provide an idle signal when the platform load is in the idle state. The transistor driver circuit 126 may receive the idle signal from the idle control device 142 and turn the buck converter 150 off in response to receiving the idle signal. Accordingly, the driving signals of the buck converter 150 (i.e., the first and second switch transistors 152, 154) may be provided or adjusted based on the feedback signal(s).

Figure 5:
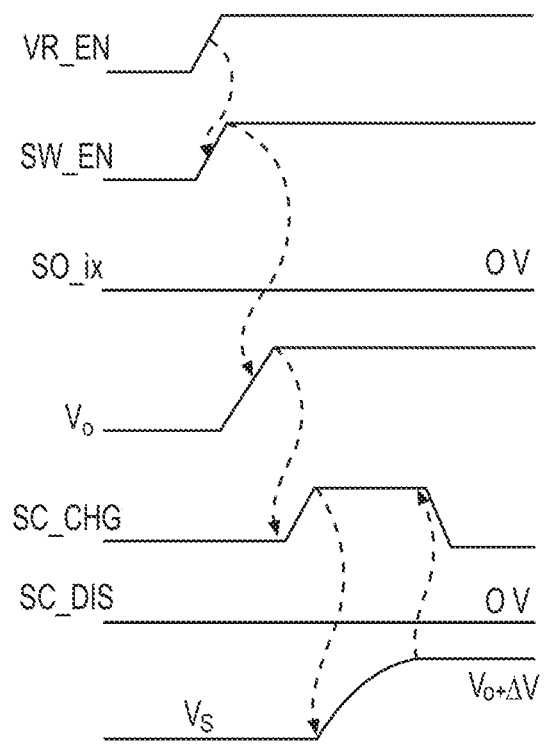

FIG. 5 is a timing diagram of a voltage regulator when power to a platform load is first turned ON (or is first powered on). Other embodiments and timing diagrams are also within the scope of the present disclosure.

More specifically, FIG. 5 shows that the first input signal VR_EN is asserted by the platform load (or electronic device) indicating that the voltage regulator 100 should start increasing (or ramping) its output voltage Vo. FIG. 5 shows the first input signal VR_EN going HIGH. In FIG. 5, the second input signal SO_iX (or idle signal) is not asserted.

Based on the assertion of the first input signal VR_EN, the transistor driver enable signal SW_EN is asserted (or goes HIGH). This enables the transistor driver circuit 126 to drive the first and second switch transistors 152, 154. The PWM control device 122 may control the output voltage to within a set tolerance (shown as +Tol % or −Tol %).

As is further shown in FIG. 5, the second control transistor 174 is turned ON by the assertion of the driving charge signal SC_CHG, and the super-capacitor 176 is charged in a constant current mode. This cycle charges the voltage $V_O$ to $V_O+\Delta V$. The $\Delta V$ may correspond to a tolerance. At this point, the driving charge signal SC_CHG may be deasserted, and the second control transistor 174 is turned OFF. Stated differently, while the buck converter 150 is turned ON, the super-capacitor 176 may be charged. Once the super-capacitor 176 is charged to a prescribed value, the charging may stop.

Figure 6:
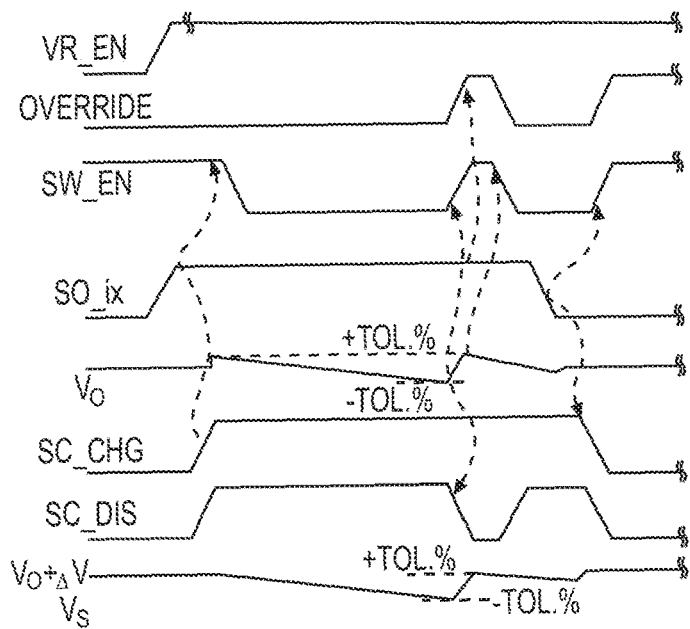
FIG. 6 is a timing diagram of a voltage regulator when a platform load is in an idle state.

FIG. 6 is a timing diagram of a voltage regulator when a platform load is in an idle state (or an idle mode or condition). Other embodiments and timing diagrams are also within the scope of the present disclosure. A determination of whether the platform load is in the idle state may be made by a component on the platform load, for example.

More specifically, when the platform load 30 is in an idle mode, the platform load 30 may notify the voltage regulator 100 by asserting the second input signal SO_iX. In other words, when the platform load 30 is in the idle mode, the second input signal SO_iX goes HIGH as shown in FIG. 6. This results in the transistor driver enable signal SW_EN being de-asserted (or going LOW) as shown in FIG. 6. This de-assertion of the transistor driver enable signal SW_EN effectively disables the transistor driver circuit 126, which in turn switches off (or turns off) the buck converter 150. In other words, when the platform load 30 operates in the idle state, the buck converter 150 is turned off.

At substantially the same time as the de-assertion of the transistor driver enable signal SW_EN, the first control transistor 172 and the second control transistor 174 of the super-capacitor device 170 are turned on (i.e., the transistors 172, 174 are enabled). Stated differently, the super-capacitor control device 146 asserts the driving charge signal SC_CHG to the second control transistor 174, and the super-capacitor control device 146 asserts the driving discharge signal SC_DIS to the first control transistor 172. As shown in FIG. 6, the driving charge signal SC_CHG and the driving discharge signal SC_DIS are both HIGH. Based on the output current that needs to be supplied to the platform load, the super-capacitor 176 starts discharging based on operation of the first and second control transistors 172, 174.

When the output voltage Vo goes below $V_O-\Delta V$, the PWM control device 122 asserts the OVERRIDE signal to override the transistor driver enable signal SW_EN. That is, the transistor driver enable signal SW_EN goes HIGH and the OVERRIDE signal goes HIGH. Based on these signals, the buck converter 150 may be turned ON, power may be supplied to the platform load, and the voltage Vs across the super-capacitor 176 may be charged to $V_O+\Delta V$. When the super-capacitor 170 is fully charged, the OVERRIDE signal may be disasserted (or goes LOW). This may turn OFF the buck converter 150 and the super-capacitor 176 may start discharging through the first and second control transistors 172, 174.

Figure 7:
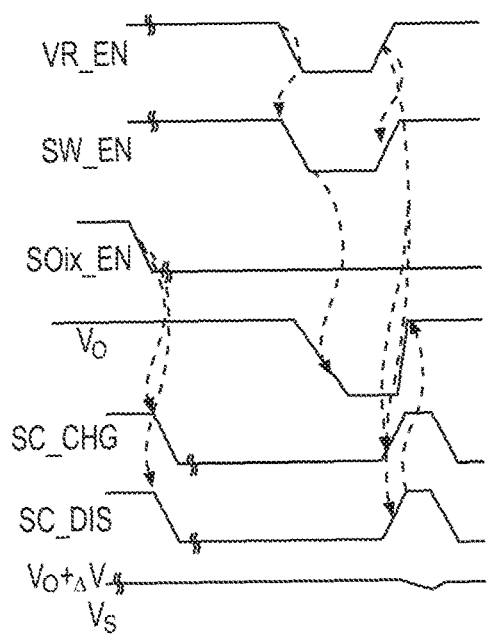
FIG. 7 is a power cycling timing diagram of a voltage regulator.

FIG. 7 is a power cycling timing diagram of a voltage regulator according to an example embodiment. Other embodiments and configurations are also within the scope of the present disclosure.

During a power cycle such as a standby/sleep mode, the charge (or voltage Vs) of the super-capacitor 176 may be preserved by disconnecting the super-capacitor 176 from the output node 16 (i.e., the voltage $V_O$) using the first and second control transistors 172, 174. FIG. 7 shows the driving charge signal SC_CHG and the driving discharge signal SC_DIS going LOW. When the first input signal VR_EN signal is asserted during a wake event, the output voltage Vo may be instantly provided through the super-capacitor 176 by asserting the driving charge signal SC_CHG and the driving discharge signal SC_DIS. Once the capacitor 158 of the buck converter 170 is charged, the super-capacitor 176 may be provided in a charge mode and the super-capacitor 176 may be charged to a voltage of $V_0+\Delta V$. The super-capacitor 176 may then be disconnected from the output voltage $V_0$ until the platform load is provided into the idle state.

Embodiments may provide a method of powering an electronic device, a system or an apparatus. This may include receiving an input voltage at the voltage regulator 100, turning on the buck converter 150 of the voltage regulator 100, providing the output voltage $V_o$ from the voltage regulator 100 while the buck converter 150 is turned on, and charging the super-capacitor 176 of the voltage regulator 100 while the buck converter 150 is turned on. The voltage regulator 100 may receive a signal indicating an idle state, and turn the buck converter 150 off in response to receiving the signal indicating the idle state. The output voltage $V_o$ may be provided from the super-capacitor 176 while the buck converter 150 is turned off. Subsequently, the buck converter 150 may be turned on when the output voltage $V_o$ is below a prescribed value.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A voltage regulator comprising:
a first circuit to receive at least one feedback signal from a buck converter including an inductor and to provide at least one driving signal to the buck converter to provide an output voltage at an output node of the buck converter based on the at least one feedback signal, and to receive an idle signal and to stop using the buck converter in response to receiving the idle signal; and
a second circuit coupled to the first circuit to control a super-capacitor coupled to the output node of the buck converter to provide the output voltage at the output node of the buck converter when the first circuit is not using the buck converter to provide the output voltage.

2. The voltage regulator of claim 1, wherein the first circuit is to provide a first driving signal to a first switch transistor of the buck converter, and to provide a second driving signal to a second switch transistor of the buck converter.

3. The voltage regulator of claim 1, wherein the second circuit is to provide a first control signal to a first control transistor of a super-capacitor device, and to provide a second control signal to a second control transistor of the super-capacitor device.

4. The voltage regulator of claim 1, wherein the first circuit includes a voltage sense device and a current sense device, the voltage sense device to receive a feedback signal indicative of the output voltage, and the current sense device to receive a feedback signal indicative of current in the buck converter.

5. The voltage regulator of claim 1, wherein the first circuit is to sense the output voltage and to use the buck converter to provide the output voltage when the at least one feedback signal indicates the output voltage falls below a threshold.

6. An electronic device comprising:
a platform load having a processor, and
a voltage regulator to provide an output voltage to the platform load, the voltage regulator including:
a buck converter including an inductor to receive a direct current (DC) voltage and to provide the output voltage at an output node of the buck converter to the platform load;
a voltage controller to receive at least one feedback signal from the buck converter, the voltage controller to provide at least one driving signal to the buck converter, and the voltage controller includes an idle control device to provide an idle signal when the platform load is in an idle state; and
a super-capacitor device coupled to the output node of the buck converter to provide the output voltage at the output node of the buck converter when the buck converter is not used to provide the output voltage.

7. The electronic device of claim 6, wherein the voltage controller is to provide a first driving signal to a first switch transistor of the buck converter, and to provide a second driving signal to a second switch transistor of the buck converter.

8. The electronic device of claim 6, wherein the voltage controller is to provide a first driving signal to a first switch transistor of the buck converter, and to provide a second driving signal to a second switch transistor of the buck converter.

9. The electronic device of claim 6, wherein the voltage controller includes a voltage sense device and a current sense device, the voltage sense device to receive a feedback signal indicative of the output voltage, and the current sense device to receive a feedback signal indicative of current in the buck converter.

10. The electronic device of claim 6, wherein the voltage controller is to sense the output voltage and to use the buck converter to provide the output voltage when the at least one feedback signal indicates the output voltage falls below a threshold.

11. The electronic device of claim 6, further comprising a battery to provide the DC voltage.

12. The electronic device of claim 6, wherein the buck converter is not used to provide the output node when the platform load is in an idle state.

13. A method of powering an electronic device comprising:
receiving an input voltage at a voltage regulator;

turning on a buck converter of the voltage regulator, the buck converter including an inductor;

providing an output voltage from the voltage regulator at an output node of the buck converter while using the buck converter;

receiving an idle signal from the electronic device and stopping use of the buck converter in response to receiving the idle signal;

charging a super-capacitor of the voltage regulator coupled to the output node of the buck converter while using the buck converter; and providing an output voltage at the output node of the buck converter from the super-capacitor while the buck converter is not being used.

14. The method of claim 13, further comprising providing a first driving signal to a first switch transistor of the buck converter and providing a second driving signal to a second switch transistor of the buck converter.

15. The method of claim 13, further comprising providing a first control signal to a first control transistor of the buck converter and providing a second control signal to a second control transistor of the buck converter.

16. The method of claim 13, further comprising sensing the output voltage and providing the output voltage from the buck converter when at least one feedback signal indicates the output voltage falls below a threshold.

17. The method of claim 15, further comprising stopping charging of the super-capacitor based on the output voltage of the voltage regulator.

\* \* \* \* \*